United States Patent
Crawford

(10) Patent No.: US 9,915,373 B2
(45) Date of Patent: *Mar. 13, 2018

(54) ELECTRONICALLY CONTROLLED PRESSURE RELIEF VALVE

(71) Applicant: FMC Technologies, Inc., Houston, TX (US)

(72) Inventor: Paul A. Crawford, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 277 days.

This patent is subject to a terminal disclaimer.

(21) Appl. No.: 14/452,193

(22) Filed: Aug. 5, 2014

(65) Prior Publication Data

US 2015/0027557 A1    Jan. 29, 2015

Related U.S. Application Data

(63) Continuation-in-part of application No. 13/135,532, filed on Jul. 8, 2011, now Pat. No. 9,109,717.

(51) Int. Cl.
    *G05D 16/20* (2006.01)
    *F16K 31/124* (2006.01)
    (Continued)

(52) U.S. Cl.
    CPC ............ *F16K 31/124* (2013.01); *F16K 17/02* (2013.01); *F16K 31/42* (2013.01); *F16K 37/005* (2013.01);
    (Continued)

(58) Field of Classification Search
    CPC ................. G05D 16/2086; G05D 16/2093; F16K 31/42; F16K 31/124; F16K 31/1245;
    (Continued)

(56) References Cited

U.S. PATENT DOCUMENTS 2,725,749 A * 12/1955 Green ............... G01L 19/0007
                                                    73/706
2,877,791 A *  3/1959 Rich ..................... F16K 7/17
                                                    137/188
(Continued)

*Primary Examiner* — William McCallister
(74) *Attorney, Agent, or Firm* — Henry C. Query, Jr.

(57) ABSTRACT

A pressure relief comprises a valve body which includes an inlet bore that is connectable to a flow line, an outlet bore that is connectable to a vent line and a valve bore that extends to between the inlet and outlet bores. A valve member is slidably supported in the valve bore and is moveable between a closed position in which the fluid in the flow line is prevented from flowing from the inlet bore to the outlet bore and an open position in which the fluid in the flow line is permitted to flow from the inlet bore to the outlet bore. A solenoid operated pilot valve is connected to the valve body over the valve bore, and a fluid chamber is located in the pilot valve above the valve member. The fluid chamber is filled with a hydraulic fluid, and the hydraulic fluid in the fluid chamber is operatively engaged with the valve member. In a closed position of the pilot valve the hydraulic fluid is trapped in the fluid chamber to thereby prevent the valve member from moving from its closed position to its open position, and in an open position of the pilot valve the hydraulic fluid is released from the fluid chamber to thereby allow the valve member to move from its closed position to its open position.

22 Claims, 8 Drawing Sheets

(51) Int. Cl.
*F16K 31/42* (2006.01)
*F16K 37/00* (2006.01)
*F16K 17/02* (2006.01)

(52) U.S. Cl.
CPC ..... *G05D 16/2086* (2013.01); *G05D 16/2093* (2013.01); *Y10T 137/0396* (2015.04); *Y10T 137/7761* (2015.04)

(58) Field of Classification Search
CPC .. F16K 37/005; F16K 17/02; Y10T 137/7761; Y10T 137/7762; Y10T 137/7769; Y10T 137/777
USPC .......................... 137/487.5, 488, 192, 492.5
See application file for complete search history.

(56) References Cited

U.S. PATENT DOCUMENTS

| | | | | |
|---|---|---|---|---|
| 2,961,147 | A * | 11/1960 | Osterkamp | F04D 27/0284 415/26 |
| 3,134,389 | A * | 5/1964 | Arline | F02K 9/566 137/14 |
| 3,308,846 | A * | 3/1967 | Yuile | F16K 17/105 137/487.5 |
| 3,548,866 | A * | 12/1970 | Kasuba | F16K 17/06 137/487.5 |
| 3,648,718 | A * | 3/1972 | Curran | F16K 1/465 137/269 |
| 3,665,945 | A * | 5/1972 | Ottenstein | F16K 31/02 137/14 |
| 3,706,320 | A * | 12/1972 | Kalsi | F16K 31/365 137/454.6 |
| 3,771,554 | A * | 11/1973 | Hassall | F15B 13/02 137/491 |
| 3,890,992 | A * | 6/1975 | Wolz | G05B 9/05 137/14 |
| 3,972,364 | A * | 8/1976 | Brumm | F16L 55/053 137/485 |
| 4,023,355 | A * | 5/1977 | McDonald | F02K 9/26 137/625.33 |
| 4,172,466 | A * | 10/1979 | Pattarini | F16K 31/383 137/488 |
| 4,215,844 | A * | 8/1980 | Bowen | F15B 1/02 251/28 |
| 4,325,406 | A * | 4/1982 | Bron | G05D 16/166 137/492.5 |
| 4,535,805 | A * | 8/1985 | Mertz | F16K 31/402 137/489 |
| 4,624,442 | A * | 11/1986 | Duffy | F16K 7/18 137/556 |
| 4,699,351 | A * | 10/1987 | Wells | F16K 31/408 251/29 |
| 4,715,578 | A * | 12/1987 | Seltzer | F16K 7/17 251/25 |
| 4,795,131 | A * | 1/1989 | Scarano | F16K 31/1223 137/625.3 |
| 4,968,221 | A * | 11/1990 | Noll | F04B 49/225 137/492.5 |
| 5,050,635 | A * | 9/1991 | Tetsuka | F16K 17/105 137/489 |
| 5,183,074 | A * | 2/1993 | Reese | F02M 37/0029 137/488 |
| 5,271,601 | A * | 12/1993 | Bonzer | F16K 31/385 251/118 |
| 5,411,375 | A * | 5/1995 | Bauer | F04C 18/16 137/492.5 |
| 5,456,582 | A * | 10/1995 | Firnhaber | F04B 39/08 251/54 |
| 5,460,196 | A * | 10/1995 | Yonnet | G05D 16/2093 137/12 |
| 5,526,883 | A * | 6/1996 | Breaux | E21B 34/16 137/492.5 |
| 5,533,873 | A * | 7/1996 | Kindl | F04B 49/225 137/529 |
| 5,590,684 | A * | 1/1997 | Alberts | F15B 13/0814 137/489 |
| 5,615,832 | A * | 4/1997 | Price | B05B 7/1404 137/489.5 |
| 5,806,553 | A * | 9/1998 | Sidwell | G05D 16/2013 137/487.5 |
| 5,842,501 | A * | 12/1998 | Powell | F16K 17/105 137/489 |
| 5,967,176 | A * | 10/1999 | Blann | F16K 31/365 137/488 |
| 6,161,570 | A * | 12/2000 | McNeely | G05D 16/166 137/491 |
| 6,161,571 | A * | 12/2000 | Taylor | G05D 16/16 137/488 |
| 6,189,563 | B1 * | 2/2001 | Taylor | F16K 31/1245 137/487.5 |
| 6,286,534 | B1 * | 9/2001 | Bliss | G05D 16/166 137/102 |
| 6,540,204 | B1 * | 4/2003 | Carter | F16K 31/406 137/489.5 |
| 6,584,999 | B2 * | 7/2003 | Inayama | G05D 16/2093 137/102 |
| 6,651,686 | B2 * | 11/2003 | Scantlin | G05D 16/18 137/461 |
| 6,766,863 | B2 * | 7/2004 | Arvidson | A62C 5/02 169/13 |
| 6,966,285 | B1 * | 11/2005 | Sun | F01L 9/02 123/90.11 |
| 7,302,961 | B2 * | 12/2007 | Martin | F16K 17/02 137/14 |
| 7,458,393 | B2 * | 12/2008 | Weingarten | F16K 1/36 137/625.34 |
| 7,578,314 | B2 * | 8/2009 | McCarty | F16K 1/34 137/625.33 |
| 7,610,936 | B2 * | 11/2009 | Spohn | A61M 5/007 137/877 |
| 7,699,075 | B2 * | 4/2010 | Bohaychuk | E21B 34/04 137/625.33 |
| 7,819,130 | B2 * | 10/2010 | Krug-Kussius | F15B 13/022 137/491 |
| 8,162,619 | B2 * | 4/2012 | Laskaris | F02D 29/04 137/492.5 |
| 8,286,661 | B2 * | 10/2012 | Krake | F16K 31/1245 137/487 |
| 8,413,677 | B1 * | 4/2013 | Coffman | F15B 13/024 137/487.5 |

\* cited by examiner

ELECTRONICALLY CONTROLLED PRESSURE RELIEF VALVE

This application is a continuation-in-part of U.S. patent application Ser. No. 13/135,532 filed on Jul. 8, 2011.

FIELD OF THE INVENTION

The present invention is directed to a pressure relief valve for relieving overpressure in a flow line. More specifically, the invention is directed to a pressure relief valve which is maintained in its normally closed position by a substantially non-compressible hydraulic fluid that is trapped in a fluid chamber by a solenoid controlled pilot valve. The pilot valve is actuated by a controller in response to signals generated by a pressure transducer. Thus, when the pressure signals indicate that an overpressure event is occurring in the flow line, the controller will actuate the pilot valve to release the hydraulic fluid from the fluid chamber and thereby allow the valve to open and relieve the overpressure in the flow line.

BACKGROUND OF THE INVENTION

Pressure relief valves are commonly used to protect flow lines and associated equipment from overpressure events. Such valves normally include an inlet which is connected to the flow line, an outlet which is connected to a vent line and a valve element which is movable between a closed position in which the outlet is isolated from the inlet and an open position in which the outlet is open to the inlet. In certain types of pressure relief valves the valve element is maintained in its normally closed position by fluid in a pressure cylinder which acts on a piston that is connected to the valve element. In order to maintain the valve element closed against normal operating pressure in the flow line, the fluid in the pressure cylinder is pressurized to a predetermined set point. Then, when the pressure in the flow line exceeds a predetermined maximum value, the force imbalance created by the overpressure will force the valve element open and allow the fluid in the flow line to flow through the outlet and into the vent line.

In the well servicing industry, well operators sometimes require the use of "full opening" pressure relief valves. These types of pressure relief valves employ a large pressure cylinder which is filled with a compressible gas. The pressure in the pressure cylinder is limited by the available gas storage supply and therefore usually requires that the area of the piston be six to eight times larger than the area of the valve element which seals the inlet. In addition, the gas pressure in the cylinder must be maintained at a predetermined set point pressure to allow the valve element to open at the desired maximum line pressure.

However, full open pressure relief valves have several shortcomings. First, they normally require additional components such as a control panel, a high pressure gas bottle and multiple hoses. Consequently, these valves are usually complex, large and difficult to set up. In addition, the gas cylinder, although pre-charged, will still exhibit a spring rate that requires the line pressure to exceed the desired maximum by some amount before the valve fully opens. Thus, even if the valve comprises quick exhaust ports, the large volume of gas required to be exhausted from the pressure cylinder will delay full opening. Furthermore, the pressure in the gas cylinder will often change with changes in ambient temperature at the job site. For example, a 40 degree change in temperature may increase the set point by about 10%, which has been deemed unacceptable by many well operators.

SUMMARY OF THE INVENTION

In accordance with the present invention, these and other limitations in the prior art are addressed by providing a pressure relief valve which comprises a valve body which includes an inlet bore that is connectable to the flow line, an outlet bore that is connectable to the vent line and a valve bore that extends to between the inlet and outlet bores; a valve member which is slidably supported in the valve bore and is moveable between a closed position in which the fluid in the flow line is prevented from flowing from the inlet bore to the outlet bore and an open position in which the fluid in the flow line is permitted to flow from the inlet bore to the outlet bore; a solenoid operated pilot valve which is connected to the valve body over the valve bore; and a fluid chamber which is located in the pilot valve above the valve member, the fluid chamber being filled with a hydraulic fluid and the hydraulic fluid in the fluid chamber being operatively engaged with the valve member. In a closed position of the pilot valve the hydraulic fluid is trapped in the fluid chamber to thereby prevent the valve member from moving from its closed position to its open position, and in an open position of the pilot valve the hydraulic fluid is released from the fluid chamber to thereby allow the valve member to move from its closed position to its open position. During operation of the pressure relief valve, the pilot valve is initially closed to contain the hydraulic fluid in the fluid chamber and thereby maintain the valve member in its closed position against pressure in the flow line, and then, when the pressure in the flow line reaches the predefined maximum pressure, the pilot valve is opened to release the hydraulic fluid from the fluid chamber and thereby allow the valve member to move from its closed position to its open position.

In one embodiment of the invention, the pilot valve comprises a central bore within which the fluid chamber is formed and a first piston which is slidably positioned in the central bore between the fluid chamber and the valve member.

In this embodiment, the central bore may be aligned with the valve bore and the first piston may be configured to engage the valve member. Also, the first piston may be configured such that, when the pilot valve is open and the valve member moves from its closed position to its open position, the valve member will move the first piston into the fluid chamber and the first piston will in turn displace the hydraulic fluid from the fluid chamber.

Thus, the pressure relief valve of the present invention offers many advantages over prior art pressure relief valves. Because the fluid chamber is filled with a substantially non-compressible hydraulic fluid instead of a compressible gas, the poppet will remain closed whether or not the set point of the valve changes over time. In addition, the pressure relief valve of the present invention does not employ a force imbalance across the poppet in order to open the poppet when the set point is reached. Instead, the poppet is opened immediately when the pilot valve opens in response to the signals generated by the pressure transducer. Therefore, the pressure relief valve of the present invention provides for a relatively quick response to an overpressure event with relatively high accuracy.

These and other objects and advantages of the present invention will now be described with reference to the accompanying drawings. In the drawings, the same reference numbers may be used to denote similar components in the various embodiments.

DETAILED DESCRIPTION OF THE INVENTION

Figure 1:
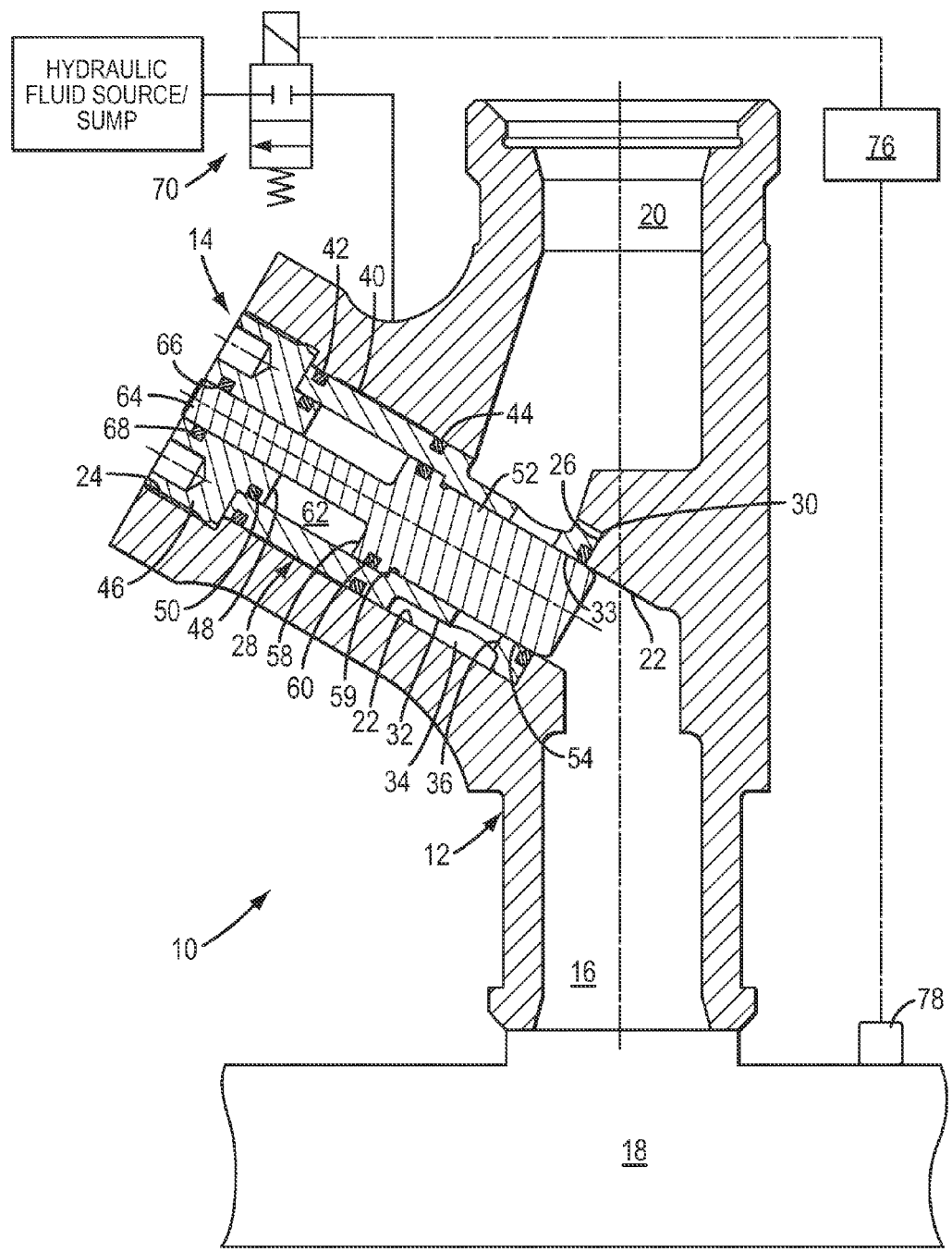
FIG. 1 is a cross sectional, partially schematic view of one embodiment of the pressure relief valve of the present invention.

The pressure relief valve in accordance with one embodiment of the present invention will now be described with reference to FIG. 1. In this embodiment, the pressure relief valve, generally 10, comprises a generally Y-shaped valve body 12 and a poppet valve 14 which is mounted in the valve body. The valve body, which may comprise a standard Y connector, includes an inlet bore 16 which is connectable to a flow line 18, an outlet bore 20 which is connectable to a vent line (not shown), and a valve bore 22 which extends to between the inlet and outlet bores. In the embodiment of the invention shown in FIG. 1, the valve bore 22 includes an enlarged diameter end portion 24 and an annular shoulder 26 which is located between the inlet and outlet bores 16, 20.

Figure 2:
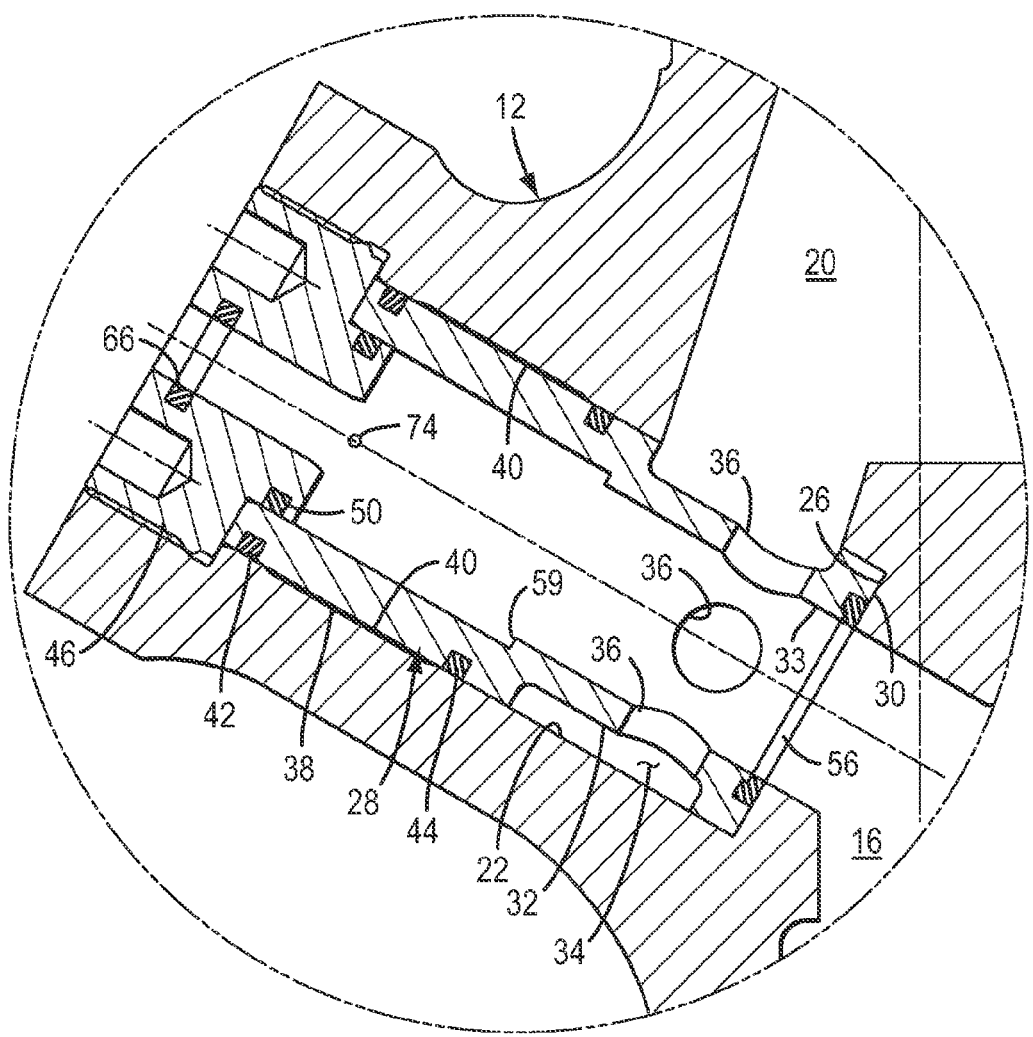
FIG. 2 is an enlarged cross sectional view of the pressure relief valve shown in FIG. 1 with the poppet component removed for clarity.

The poppet valve 14 includes a generally tubular poppet cage 28 which is positioned in the valve bore 22. Referring also to FIG. 2, the poppet cage 28 includes a circular seat 30 which engages the shoulder 26 of the valve bore 22. A lower portion 32 of the poppet cage 28 located above the seat 30 has an inner diameter surface 33 and an outer diameter which is smaller than the diameter of the valve bore 22 to thereby form a lower annulus 34 which communicates with the outlet bore 20. A number of flow ports 36 extend transversely through the lower portion 32 between the inner diameter surface 33 and the lower annulus 34. An upper portion 38 of the poppet cage 22 has an outer diameter which is slightly smaller than the diameter of the valve bore 22 to thereby form an upper annulus 40 between the poppet cage and the valve bore. Alternatively, the inner diameter of the valve bore 22 may be recessed to form the upper annulus 40. In the embodiment of the invention shown in FIGS. 1 and 2, the upper annulus 40 is bounded by upper and lower ring seals 42, 44 which are positioned between the poppet cage 28 and the valve bore 22. The purpose of this arrangement will be described below.

Figure 2A:
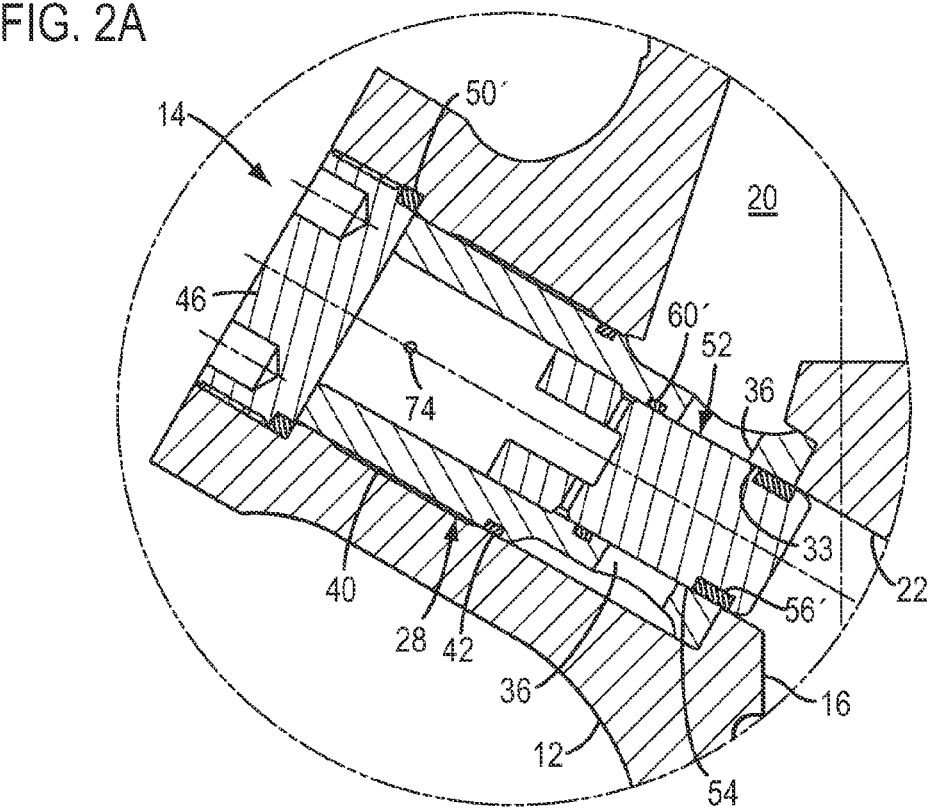
FIG. 2A is an enlarged cross sectional view of the poppet valve component of a second embodiment of the pressure relief valve of the present invention.

The poppet cage 28 is retained in the valve bore 22 by a body cap 46 which is threaded into the enlarged diameter end portion 24. In this embodiment, the body cap 46 includes a lower end portion 48 which is received in the top of the poppet cage 28 and is sealed thereto by a suitable ring seal 50. In an alternative embodiment of the invention which is shown in FIG. 2A, the body cap 46 is sealed directly to the valve body 12 by a suitable cap seal 50'. In this embodiment, the upper annulus 40 between the poppet cage 28 and the valve bore 22 is defined by the lower ring seal 42 and the cap seal 50'. When assembling the pressure relief valve 10, the body cap 46 is ideally tightened to a degree which is sufficient to generate a pre-load on the poppet cage 28 which will maintain the contact between the shoulder 26 and the seat 30 at the maximum anticipated working pressure in the flow line 18.

The poppet valve 14 also includes a closure member which blocks the flow of fluid from the inlet bore 16 to the outlet bore 20 when the pressure relief valve 10 is in the closed position. In the embodiment of the invention shown in FIG. 1, for example, the poppet valve 14 may comprise a poppet 52 which is slidably supported in the poppet cage 28 and which functions to seal the inlet bore 16 from the flow ports 36, preferably as the poppet moves slightly relative to the flow ports. As shown in FIG. 1, the poppet 52 includes a lower end portion 54 which when the poppet valve 14 is closed extends through a rod seal or the like 56 that is positioned in a corresponding groove in the poppet cage 28 between the inlet bore 16 and the flow ports 36. In this position, the outer diameter surface of the lower end portion 54 seals against the rod seal 56 and thereby prevents fluid in the flow line 18 from flowing through the flow ports 36. In the alternative embodiment of the invention shown in FIG. 2A, the poppet 52 comprises a piston seal or the like 56' around the lower end portion 54 which when the poppet is in its closed position seals against the inner diameter surface 33 of the poppet cage below the flow ports 36. Alternatively, the piston seal 56' may seal to the valve bore 22 located below the poppet cage 28.

Referring again to FIG. 1, the poppet 52 also includes an enlarged diameter upper end portion 58 which engages an annular stop 59 on the inner diameter surface of the poppet cage 28 in order to limit the extent to which the lower end portion 54 moves relative to the flow ports 36 when the poppet valve 14 is closed. A ring seal 60 mounted on the upper end portion 58 engages the inner diameter surface of the poppet cage 28 to thereby form a sealed fluid chamber 62 between the poppet 52 and the body cap 46. As will be described more fully below, a substantially non-compressible fluid in the fluid chamber 62 controls whether the poppet valve 14 remains in its closed position or is permitted to move to its open position. When the poppet valve 14 is permitted to move to its open position, the lower end portion 54 retracts to a position above the flow ports 36 to thereby allow fluid in the flow line 18 to flow through the flow ports and into the outlet bore 20.

An optional stem 64 extends axially from the piston portion 58 through a corresponding hole 66 in the body cap 46. The stem 64 is sealed to the hole 66 by a suitable ring seal 68 to maintain the pressure integrity of the fluid chamber 62. When the pressure valve 14 is in its closed position, the top of the stem 64 is generally flush with the body cap 46. However, when the poppet valve 14 is in its open position, the stem 64 projects beyond the body cap 46. Thus, the stem 64 provides a visual indication of the open or closed state of the poppet valve 14.

In the alternative embodiment of the invention shown in FIG. 2A, the optional stem 64 is omitted from the poppet 52 and the hole 66 is omitted from the body cap 46. In addition, instead of positioning the ring seal 60 in an annular groove on the outer diameter of the poppet 52, a ring seal 60' is positioned in an annular groove on the inner diameter of the poppet cage 28.

Figure 3:
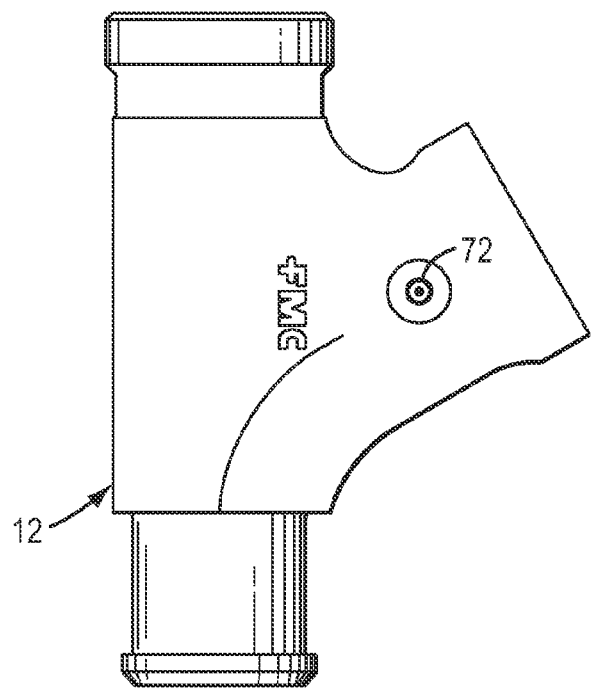
FIG. 3 is a side elevation view of the pressure relief valve shown in FIG. 1.

In accordance with the present invention, the poppet valve 14 is maintained in its closed position by filling the fluid chamber 62 with a substantially non-compressible fluid, such as hydraulic fluid. Referring again to FIG. 1, the hydraulic fluid is conveyed to the fluid chamber 62 through a solenoid operated pilot valve 70. Referring also to FIG. 3, the pilot valve 70 is connected to a supply/exhaust hole 72 in the valve body 12, which is fluidly connected to the upper annulus 40 located between the valve bore 22 and the poppet cage 28. The upper annulus 40 in turn is connected to the fluid chamber 62 through a supply/exhaust port 74 in the poppet cage 28 (FIG. 2).

The pilot valve 70 may be activated by a suitable controller 76 in response to signals generated by a pressure transducer 78. The pressure transducer 78 may be positioned in the flow line 18 or in the inlet port 16. When the controller 76 determines from the signals generated by the pressure transducer 78 that an overpressure event is occurring in the flow line 18, the controller will open the pilot valve 70 to vent the hydraulic fluid from the fluid chamber 62. This will allow the pressure in the flow line 18 to force the poppet 52 into its open position and thus allow fluid in the flow line to be discharged through the flow ports 36 and the outlet bore 20. In certain embodiments of the invention, the controller 76 may comprise a control relay and the pressure transducer 78 may comprise a line pressure gauge which generates a signal in response to an overpressure event that is relayed by the controller to the pilot valve 70 in order to open the pilot valve.

In operation of an exemplary embodiment of the invention, the fluid chamber 62 is preferably completely filled with hydraulic fluid at a pressure of about, e.g., 250 psi. The pilot valve 70 is then closed to trap the hydraulic fluid in the fluid chamber 62. The pilot valve 70 may be a 2-way valve which is normally closed when the solenoid is energized and is capable of achieving bubble tight shut-off at any pressure up to the rated pressure of the pressure relief valve 10. Since the hydraulic fluid is substantially non-compressible, and since the fluid chamber 62 is preferably completely filled with the hydraulic fluid, the volume of the hydraulic fluid in the fluid chamber will not change (or will change only slightly) as the force generated by the pressure in the flow line 18 pushes against the lower end portion 54 of the poppet 52. Consequently, the hydraulic fluid trapped by the pilot valve 70 in the fluid chamber 62 will maintain the poppet 52 in the closed position against the force generated by pressure in the flow line 18. With respect to the embodiments of the invention shown in FIGS. 2 and 2A, the relatively fixed volume of hydraulic fluid in the fluid chamber 56 will prevent the poppet 52 from moving to the extent required for the lower end portion 54 to disengage from the rod seal 56 or for the piston seal 56' to disengage from the inner diameter surface 33 of the poppet cage 28 or the valve bore 22. Thus, the hydraulic fluid does not need to be pressurized in order to counterbalance the pressure in the flow line 18. This arrangement contrasts significantly with the prior art, in which the gas in the pressure cylinder must be pressurized to a level which is sufficient to counterbalance the pressure in the flow line in order to prevent the valve element from disengaging from its corresponding valve seat. In a preferred embodiment of the invention, the cross sectional area of the upper end portion 58 of the poppet 52, less the cross sectional area of the stem 64 (if present), is about the same as, but ideally no less than, the cross sectional area of the lower end portion 54. This will ensure that the volume of hydraulic fluid required to control the poppet 52 is minimized and that the pressure of the hydraulic fluid will never be higher than the pressure in the flow line 18.

The pressure transducer 78 monitors the pressure in the flow line 18 and, when this pressure reaches a predetermined relief pressure, the controller 76 will de-energize the solenoid to open the pilot valve 70. This will allow the hydraulic fluid to exit the fluid chamber 62 through the supply/exhaust port 74, the upper annulus 40 and the supply exhaust hole 72 as the poppet 52 is opened by the force of the pressure in the flow line 18. After pressure in the flow line 18 is relieved through the pressure relief valve 10, the fluid chamber 62 is once again filled with hydraulic fluid at a pressure of about, e.g., 250 psi to move the poppet 52 to its closed position and thereby close the pressure relief valve 10, after which the pilot valve 70 is again closed to trap the hydraulic fluid in the fluid chamber.

Figure 4:
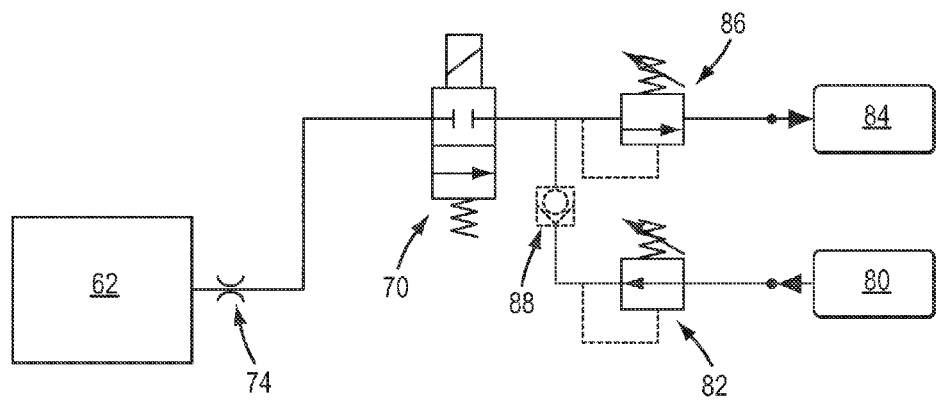
FIG. 4 is a schematic view of one embodiment of a piloting system for the pressure relief valve of the present invention.

The fluid chamber 62 may be supplied with hydraulic fluid using a piloting system such as shown in FIG. 4. In this embodiment, the fluid chamber 62 is connected to a source of hydraulic fluid 80 through the pilot valve 70 and a hydraulic reducing valve 82. In addition, the fluid chamber 62 is connected to a hydraulic sump 84 through the pilot valve 70 and a hydraulic relief valve 86. When the pilot valve 70 is opened in response to an overpressure event, the hydraulic fluid in the fluid chamber 62 is vented through the hydraulic relief valve 86 and into the hydraulic sump 84. In this embodiment, the diameter of the supply/exhaust port 74 in the poppet cage 28 is chosen so that when the pilot valve 70 is open, the pressure between the supply/exhaust port and the hydraulic reducing and hydraulic relief valves 82, 86 does not exceed the pressure rating of the valves, which may be, e.g., about 3,000 psi.

Once the pressure of the piloting system drops to below the set pressure of the hydraulic relief valve 86, the hydraulic relief valve closes and the hydraulic reducing valve 82 opens to once again supply the fluid chamber 62 with hydraulic fluid at a pressure of about, e.g., 250 psi, which causes the poppet 52 to move into its closed position and thereby close the pressure relief valve 10. In this regard, the set pressure of the hydraulic relief valve 86 may be somewhat higher than the set pressure of the hydraulic reducing valve 82. This arrangement allows the hydraulic fluid from the fluid chamber 62 to flow only through the hydraulic relief valve 86. When pressure in the hydraulic relief valve 86 goes to below its set point, the pressure in the piloting system will have dropped below the set pressure of the hydraulic reducing valve 82. This allows the hydraulic reducing valve 82 to open and recharge the piloting system.

As an alternative to the piloting system just described, the pilot valve 70 may comprise a 3-position, 3-way pilot valve. In this case, the hydraulic relief and hydraulic reducing valves 82, 86 would not be necessary. Instead, in one position the pilot valve 70 would connect the fluid chamber 62 to the source of hydraulic fluid 80, in a second position the pilot valve would connect the fluid chamber to the hydraulic sump 84, and in a third position the pilot valve would be closed.

As a alternative to the second piloting system just described, the pilot valve 70 may comprise a 2-position, three-way pilot valve. In this embodiment, the third position is eliminated by adding a check valve 88 (shown in phantom in FIG. 4) between the pilot valve 70 and the source of hydraulic fluid 80. The check valve 88 would allow flow from the source of hydraulic fluid 80 when the piloting system and fluid chamber 62 are being recharged. After recharging, the check valve would then act to trap hydraulic fluid in the fluid chamber 62.

Figure 5:
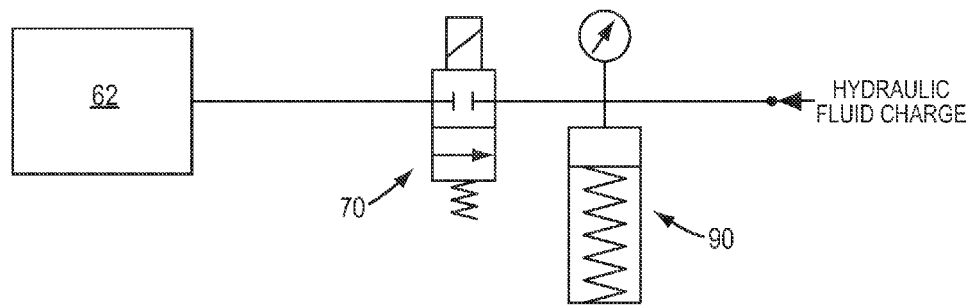
FIG. 5 is a schematic view of another embodiment of a piloting system for the pressure relief valve of the present invention.

Another embodiment of a piloting system for supplying the fluid chamber 62 with hydraulic fluid is shown in FIG. 5. In this system the fluid chamber 62 is connected through the pilot valve 70 to an accumulator or spring return cylinder 90. The accumulator or spring return cylinder 90 is charged with hydraulic fluid at a pressure of about, e.g., 250 psi. In operation of this embodiment, the pilot valve 70 is opened to allow hydraulic fluid to flow from the accumulator or spring return cylinder 90 into the fluid chamber 62, after which the pilot valve 70 is closed to trap the hydraulic fluid in the fluid chamber. During an overpressure event, the pilot valve 70 is opened and the hydraulic fluid is forced from the fluid chamber 62 back into the accumulator or spring return cylinder 90 as the poppet 52 is opened under the force of the pressure in the flow line 18. Then, once the pressure in the flow line 18 is relieved, the accumulator or spring return cylinder 90 forces the hydraulic fluid back into the fluid chamber 62 to re-seat the poppet 52 and thereby close the pressure relief valve 10, after which the pilot valve 70 is closed to trap the hydraulic fluid in the fluid chamber. In the case where the poppet 52 does not employ the optional stem 64 for providing a visual indication of the open or closed state of the poppet valve 14, a similar indicator may be added to the accumulator or spring return cylinder 90 for this purpose.

Another embodiment of the pressure relief valve of the present invention will now be described with reference to FIGS. 6-9. In this embodiment, the pressure relief valve, generally 110, comprises a main valve 112 and a pilot valve 114 which is mounted to the main valve. In the illustrative embodiment of the invention shown in FIG. 6, the main valve 112 includes a generally T-shaped valve body 116 having an inlet bore 118 which is connectable via, e.g., a WECO® wing union 120, to a flow line (not shown), an outlet bore 122 which is connectable to a vent line (not shown), and a valve bore 124 which extends to between the inlet bore and the outlet bore. The inlet bore 118 may comprise a reduced diameter portion 126 which defines a first shoulder 128 located between the inlet bore and the valve bore 124, and the outlet bore 122 may similarly comprise a reduced diameter portion 130 which defines a second shoulder 132 located between the outlet bore and the valve bore.

The main valve 112 also includes a valve member 134 which is movable in the valve bore 124 between a closed position (shown in FIG. 6) in which the valve member prevents fluid from flowing between the inlet bore 118 and the outlet bore 122 and an open position in which the valve member permits fluid to flow between the inlet bore and the outlet bore. In the illustrative embodiment of the invention shown in FIG. 6, the valve member 134 is a poppet which is slidably supported in a tubular poppet cage 136 that is positioned in the valve bore 124 against the first shoulder 128.

Figure 6:
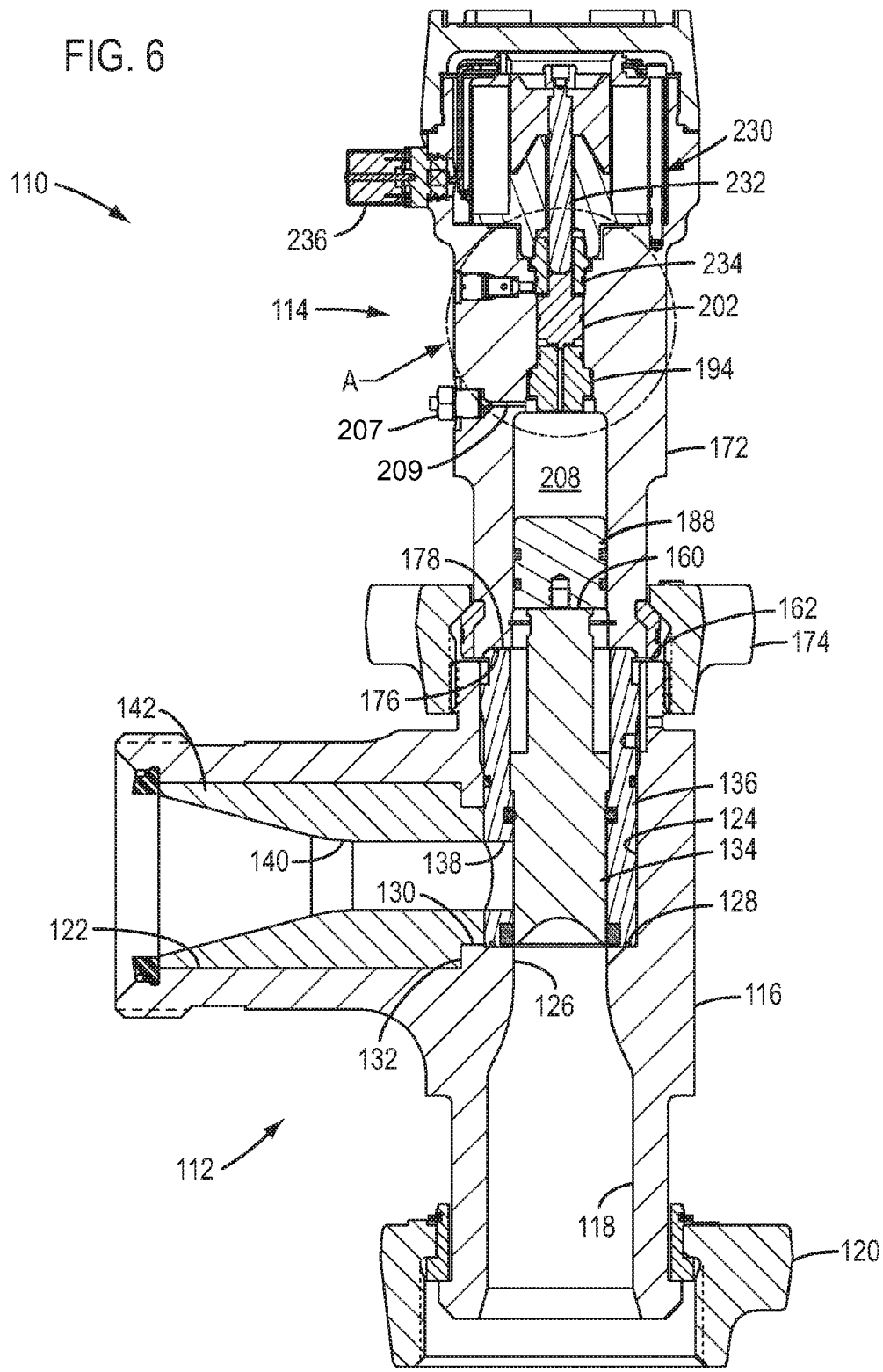
FIG. 6 is a cross sectional view of another embodiment of the pressure relief valve of the present invention.
Figure 7:
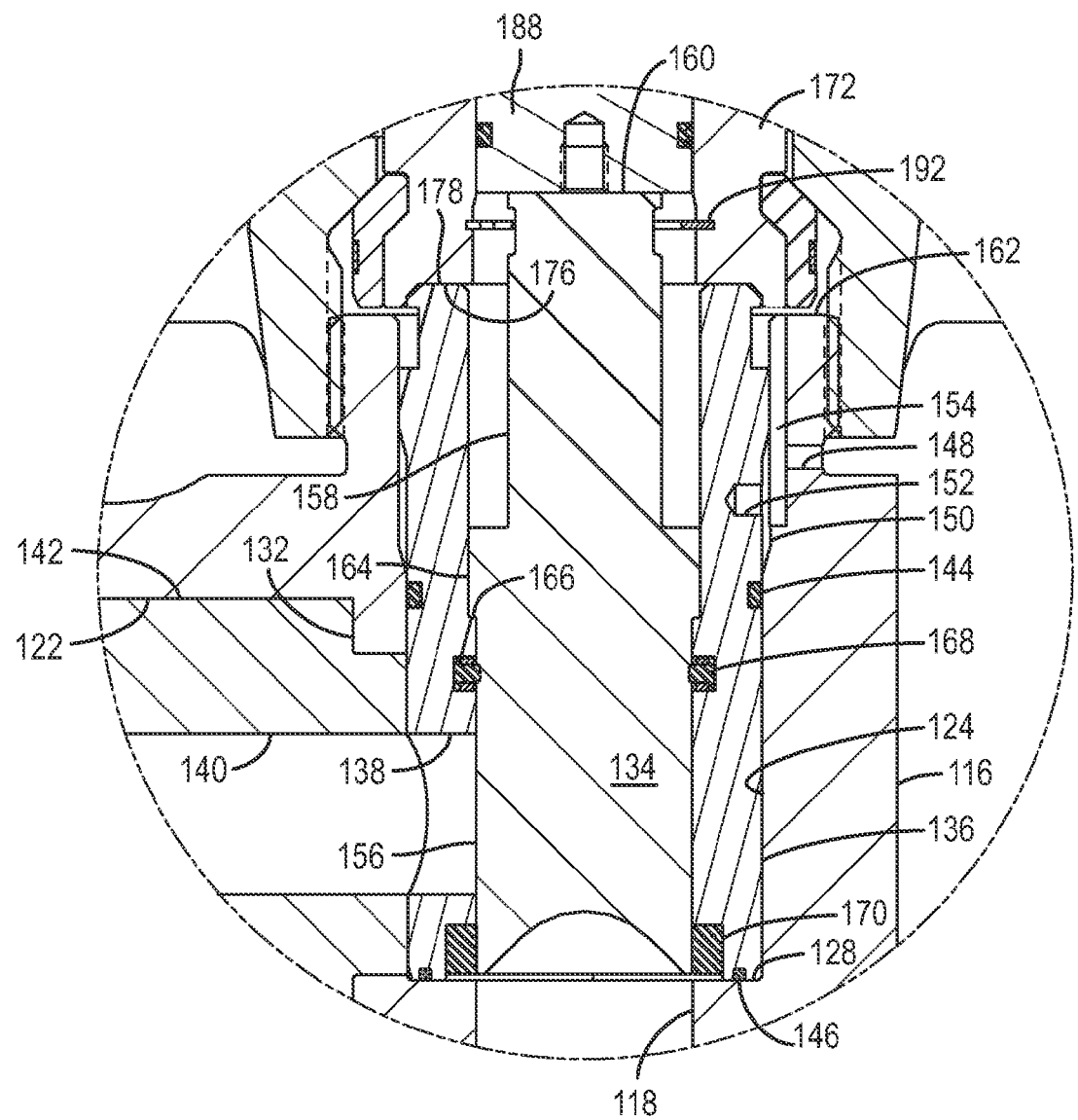
FIG. 7 is an enlarged cross sectional view of the poppet valve component of the pressure relief valve shown in FIG. 6.

Referring also to FIG. 7, the poppet cage 136 includes at least one flow port 138 which extends transversely through the poppet cage and is fluidly connected to the outlet bore 122. In the specific embodiment of the invention shown in FIGS. 6 and 7, the flow port 138 is fluidly connected to an insert bore 140 which extends through a bore insert 142 that is positioned in the outlet bore 122 against the second shoulder 132. The poppet cage 136 is sealed to the valve bore 124 by a first annular seal 144 which is located above the flow port 138 and a second annular seal 146 which is located below the flow port (e.g., between the poppet cage and the first shoulder 128).

Although not required, the valve body 116 may include a leak detection port 148 which communicates with an annulus 150 between the valve bore 124 and the poppet cage 136 above the first annular seal 144. Also, the poppet cage 136 may comprise a hole 152 for an alignment key which engages an axial slot 154 in the valve bore 124 to aid in aligning the flow port 138 with the outlet bore 122 (or the insert bore 140).

Referring still to FIGS. 6 and 7, the valve member 134 includes a cylindrical lower end portion 156 which is configured to span the flow port 138 when the valve member is in the closed position and an upper end portion 158 which comprises an upper end surface 160 that, in the particular embodiment of the invention shown in FIGS. 6 and 7, extends above an upper end 162 of the valve body 116 when the valve member is in its closed position. The valve member 134 may also include an enlarged diameter middle portion 164 which engages an annular stop 166 on the inner diameter surface of the poppet cage 136 in order to limit further downward movement of the valve member when the valve member is in its closed position.

The lower end portion 156 of the valve member 134 is sealed to the poppet cage 136 by a first annular seal 168 which is located above the flow port 138. When the valve member is in the closed position, the lower end portion 156 is also sealed to the poppet cage 136 by a second annular seal 170 which is located below the flow port 138. In this manner, when the valve member 136 is in the closed position, the lower end portion 156 will seal against the second annular seal 170 and prevent fluid in the inlet bore 118 from flowing into the outlet bore 122. When the valve member 136 is in the open position (not shown), the bottom of the lower end portion 156 will be located above the flow port 138 and thus allow fluid to freely flow from the inlet bore 118 to the outlet bore 122.

Movement of the valve member 136 from its closed position to its open position is effected by the pilot valve 114. As will be described in more detail below, the pilot valve 114 comprises a fluid chamber which is filled with a substantially non-compressible fluid. The non-compressible fluid in the fluid chamber is operatively engaged with the valve member 134, that is, the non-compressible fluid in the fluid chamber directly affects the operation of the valve member depending on the state of the fluid chamber, which in turn is controlled by the pilot valve 114. When the pilot valve 114 is closed the fluid chamber is closed, and the non-compressible fluid trapped in the fluid chamber prevents the valve member from moving from its closed position to its open position. When the pilot valve 114 is open the fluid chamber is open, and the unconstrained hydraulic fluid no longer prevents the valve member from moving from its closed position to its open position. This aspect of the present invention will be made apparent below.

The pilot valve 114 includes a pilot valve body 172 which is positioned over the valve body 116 and is removably connected to the upper end 162 of the main valve body 116 by, e.g., a hammer nut 174. The pilot valve body 172 includes a lower end surface 176 which engages an upper end surface 178 of the poppet cage 136 to thereby secure the poppet cage in position in the valve bore 124 when the pilot valve 114 is connected to the main valve 112.

Figure 8:
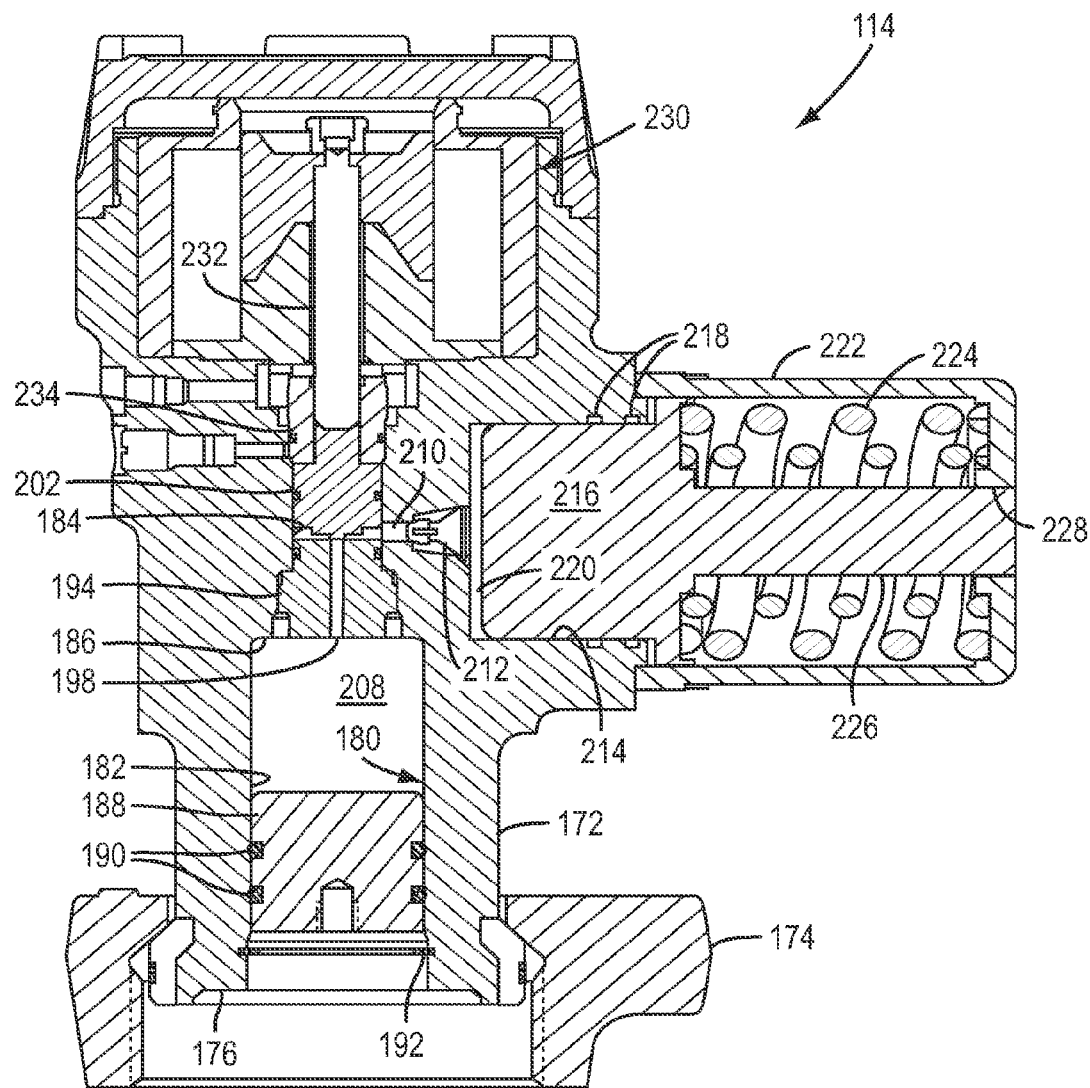
FIG. 8 is an enlarged cross sectional view of the pilot valve component of the pressure relief valve shown in FIG. 6 rotated 90° about the longitudinal axis of the valve.

Referring also to FIG. 8, the pilot valve body 172 comprises a central bore 180 which includes a lower bore section 182, a reduced diameter upper bore section 184 and a downward directed shoulder 186 which is located between the upper and lower bore sections. A main piston 188 is slidably received in the lower bore section 182 and is sealed thereto by a number of annular seals 190. As shown in FIG. 6, when the pilot valve 114 is assembled with the main valve 112, the main piston 188 is free to engage the upper end surface 160 of the valve member 134. An optional retaining ring 192 may be installed in the lower bore section 182 to retain the main piston 188 in the central bore prior to assembly of the pilot valve 114 with the main valve 112.

Figure 9:
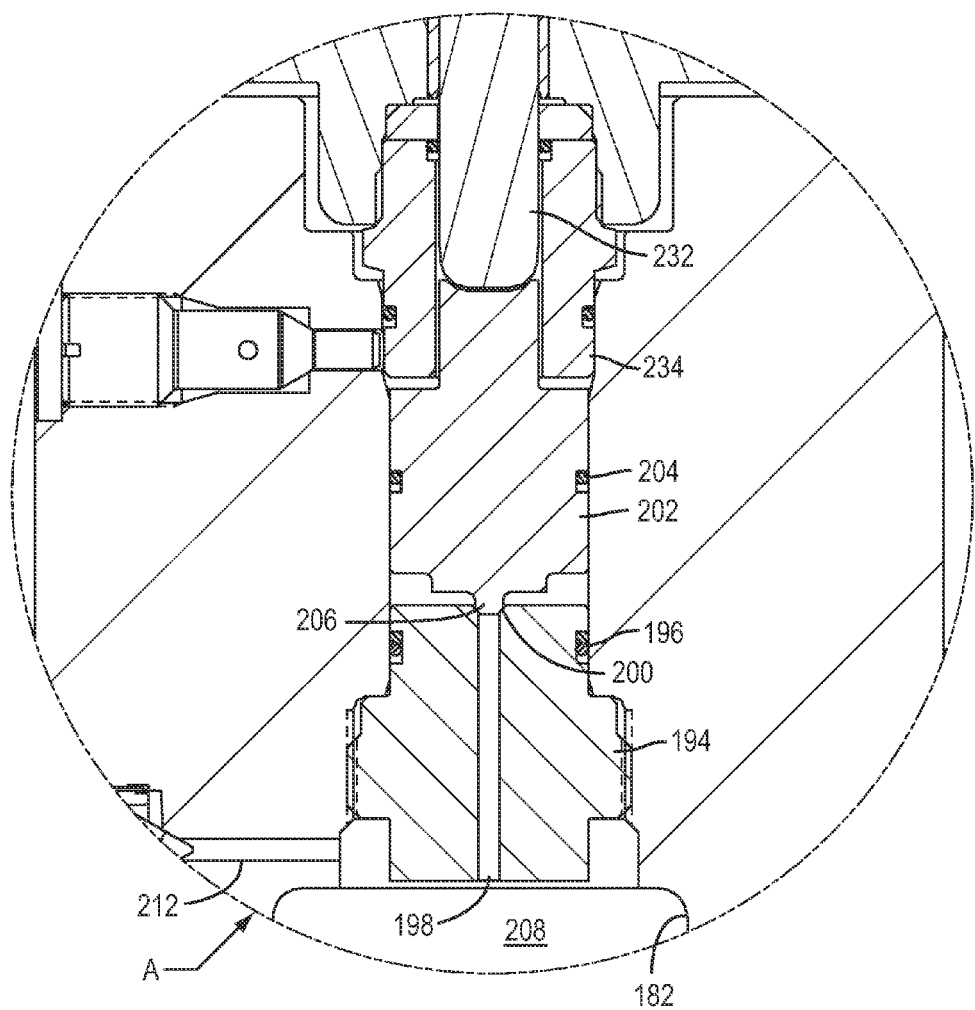
FIG. 9 is an enlarged cross sectional view of a portion of the pilot valve identified by the arrow A in FIG. 6.

Referring also to FIG. 9, a seat member 194 is secured in the upper bore section 184 and is sealed thereto by at least one annular seal 196. The seat member 194 includes an axial through hole 198 having an upper end which is configured as a valve seat 200. Above the seat member 194, a pilot piston 202 is slidably received in the upper bore section 184 and is sealed thereto by at least one annular seal 204. The pilot piston 202 includes a downwardly directed closure member 206 which is configured to cooperate with the valve seat 200 to thereby seal off the through hole 198 when the pilot piston is in the closed position shown in FIG. 9.

As discussed above, the pilot valve 114 comprises a fluid chamber 208 which, in the exemplary embodiment of the invention shown in the drawings, is formed in the central bore 180. Specifically, the fluid chamber 208 is located in the lower bore section 182 between the main piston 188 and the seat member 194. Prior to placing the pressure relief valve 110 into operation, the fluid chamber 208 is filled with a substantially non-compressible fluid, such as a hydraulic fluid, which is introduced into the fluid chamber through a suitable quick disconnect fitting 207 and a fill port 209 (FIG. 6). The hydraulic fluid is introduced into the fluid chamber 208 at a slight pressure, e.g., 250 psi, which is sufficient to force the main piston 188 downward against the valve member 134 and thereby move the valve member to its fully closed position.

In the particular embodiment of the invention shown in the drawings, the pilot valve 114 is closed when the pilot piston 202 is in its closed position. When the pressure in the flow line (such as the flow line 18 shown in FIG. 1) is below a preset relief pressure, the pilot valve 114 will maintain the pilot piston 202 is in its closed position. When the pilot piston 202 is in its closed position, the hydraulic fluid in the fluid chamber 208 will hold the main piston 188 against the valve member 134 to thereby maintain the valve member in its closed position. Since the hydraulic fluid is substantially non-compressible, the volume of hydraulic fluid in the fluid chamber 208 will not change (or will change only slightly) as the force generated by the pressure in the flow line pushes against the lower end face of the valve member 134. Thus, the hydraulic fluid trapped by the pilot piston 202 in the fluid chamber 208 will maintain the valve member 134 in the closed position against the force generated by the pressure in the flow line. As a result, the hydraulic fluid in the fluid chamber 208 does not need to be pressurized in order to counterbalance the pressure in the flow line.

When an overpressure event occurs, that is, when pressure in the flow line exceeds a preset relief pressure, the pilot valve 114 will open, that is, the pilot valve will effect the movement of the pilot piston 202 to an open position (not shown) in which the closure member 206 is spaced apart from the valve seat 200. In accordance with one embodiment of the invention, when an overpressure event occurs the pilot valve 114 will cease holding the pilot piston 202 closed (in a manner which will be made apparent below). As a result, the pressure in the fluid line will cause the valve member 134 to push the main piston 188 into the fluid chamber 208, which in turn will force the hydraulic fluid through the through hole 198 and against the pilot piston 202 to thereby move the pilot piston to the open position. In an alternative embodiment of the invention, the pilot valve 114 may actively move the pilot piston 202 to its open position independent of any force generated by the hydraulic fluid in the fluid chamber 208.

As shown most clearly in FIG. 8, with the pilot piston 202 in the open position, the fluid chamber 208 is connected via the through hole 198 to a relief port 210 which intersects the upper bore section 184 between the seat member 194 and the pilot piston 202. In the illustrative embodiment of the invention shown in FIG. 8, the relief port 210 is connected via an orifice check valve 212 to a relief bore 214 which extends through the side of the pilot valve body 172. The orifice check valve 212 is oriented to allow relatively unrestricted flow from the relief port 210 to the relief bore 214 but to limit flow in the opposite direction. A relief piston 216 is slidably supported in the relief bore 214 and is sealed thereto by a number of annular seals 218 to thereby define a relief chamber 220 between the relief port 210 and the relief piston. A body cap 222 is secured to the pilot valve body 172 over the relief bore 214. The body cap 222 houses a compression spring 224 which is operatively engaged between an inner end face of the body cap and a side of the relief piston 216 opposite the relief chamber 220. The compression spring 224 is designed such that the pressure generated by the relief piston 216 on the hydraulic fluid in the relief chamber 220 and the fluid chamber 208 is sufficiently low so as not to inhibit the rapid opening of the valve member 134 if an overpressure event occurs, but sufficiently high so as to be able to move the valve member into its closed position when the pressure in the flow line drops below a predetermined lower limit, such as 200 psi. Other means for controlling the pressure which the relief piston 216 exerts on the hydraulic fluid may be employed in the present invention. For example, the volume between the body cap 222 and the relief piston 216 may be filled with a compressible fluid having the same or similar characteristics as the spring 224.

When an overpressure event occurs, the pressure in the flow line will act, through the valve member 134 and the main piston 188, to force the hydraulic fluid from the fluid chamber 188, through the relief port 210 and the orifice check valve 212 and into the relief chamber 220. The hydraulic fluid will displace the relief piston 216 to the right (as viewed in FIG. 8) against the force of the compression spring 224 and will continue to flow into the relief chamber 220 until the top of the main piston 188 engages the shoulder 186 at the top of the lower bore section 182. At this point, the valve member 134 will be in its fully open position and the high pressure fluid in the fluid line will be allowed flow from the inlet bore 118 to the outlet bore 122 and into the vent line (not shown).

Although not required, the pilot valve 114 may include means for providing a visual indication of the position of the valve member 134. For example, the relief piston 216 may comprise an elongate stem 226 which extends through an opening 228 in the distal end of the body cap 222. When the valve member 134 is in its closed position, the top of the stem 226 is generally flush with the end of the body cap 222.

However, when an overpressure event occurs, the hydraulic fluid in the fluid chamber 208 will flow into the relief chamber 220 and displace the relief piston 216 to the right (as viewed in FIG. 8). This action will cause the stem 226 to project beyond the end of the body cap 222 and thereby provide a visual indication that the valve member 134 is open.

Movement of the pilot piston 202 from its closed position to its open position is effected by a conventional solenoid 230. The solenoid 230 includes a plunger rod 232, the lower end of which extends through a seal sleeve 234 positioned in the upper bore section 184 and engages the top of the pilot piston 202. When the solenoid 230 is energized, via a current supplied through an electrical connector 236 (FIG. 6), the plunger rod 232 exerts a downward force on the pilot piston 202 which will hold the pilot piston in its closed position. When the solenoid is de-energized, the downward force exerted by the plunger rod 232 is relieved and the pilot piston 202 is moved to its open position by the hydraulic fluid in the fluid chamber 208 (in the manner described above). Alternatively, the pilot valve 114 may be configured such that the plunger rod 232 will actively move the pilot piston 202 from its closed position to its open position when the solenoid 230 is de-energized. As with the pressure relief valve embodiments described above, the solenoid 230 is controlled by a controller in response to signals generated by a pressure transducer which monitors the pressure in the flow line.

The operation of the pressure relief valve 110 will now be described. During setup of the pressure relief valve 110, the solenoid 230 is de-energized to allow the pilot piston 202 to open and the fluid chamber 208 is filled with hydraulic fluid to a pressure, such as, e.g., 250 psi, which is sufficient to force the main piston 188 downward against the valve member 134 and thereby move the valve member to its closed position. The solenoid 230 is then energized to close the pilot piston 202 and thereby trap the hydraulic fluid in the fluid chamber 208. This fixed volume of non-compressible fluid in the fluid chamber 208 will maintain the valve member 134 in its closed position against the force generated by the pressure in the fluid line. As the pressure in the fluid line increases, the pressure of the hydraulic fluid in the fluid chamber 208 will also increase.

If an overpressure event occurs, the controller will de-energize the solenoid 230, which in turn will cause the pressurized hydraulic fluid in the fluid chamber 208 to open the pilot piston 202 and thereby connect the fluid chamber to the relief chamber 220. As a result, the pressure of the hydraulic fluid in the fluid chamber 208 will rapidly drop to the pressure generated by the relief piston 216. Consequently, the overpressure in the fluid line will immediately move the valve member 134 toward its open position, which in turn will force the main piston 188 into the fluid chamber 208 and cause the hydraulic in the fluid chamber to quickly flow through the orifice check valve 212 and into the relief chamber 220. As the hydraulic fluid forces the relief piston 216 against the spring 224, the pressure of the hydraulic fluid in the relief chamber 220 will increase, but not to a level which will inhibit the rapid opening of the valve member 134. With the valve member 134 open, the overpressure in the flow line will be vented through the outlet bore 122 and into the vent line.

After the overpressure event is resolved and the pressure in the flow line drops to below the predetermined lower limit, the relief piston 216 will force the hydraulic fluid in the relief chamber 220 back through the orifice check valve 210 and into the fluid chamber 208, which in turn cause the valve member 134 to move back to its closed position. With the valve member 134 closed, the solenoid 230 is energized to close the pilot piston 202 and the pressure relief valve 110 is again ready for operation.

Thus, it may be seen that the hydraulic fluid in the fluid chamber 208 is operatively engaged with the valve member 134. By this we mean that the hydraulic fluid directly affects the operation of the valve member 134 depending on the state of the fluid chamber 208. When the fluid chamber 208 is closed to contain the hydraulic fluid therein, the valve member 134 is maintained in its closed position against pressure in the flow line. When the fluid chamber 208 is opened to allow the hydraulic fluid to escape therefrom, the valve member 134 is free to move from its closed position to its open position under the influence of the pressure in the flow line.

In the embodiment of the invention shown in FIGS. 6-9, the main piston 188 is positioned between the valve member 134 and the fluid chamber 208. Thus, the hydraulic fluid in the fluid chamber 208 is operatively engaged with the valve member 134 through its interaction with the main piston 188. However, it should be understood that the main piston 188 is not a necessary element of the invention. For example, the upper end portion 158 of the valve member 134 could itself extend into and be sealed to the lower bore section 182 to thereby define the lower extent of the fluid chamber 208. In this case, the hydraulic fluid in the fluid chamber 208 would act directly on the upper end portion 158 to control the movement of the valve member 134.

The provision of the main piston 188 in the pilot valve 114 provides several advantages. For example, the main piston 188 will ensure that the fluid chamber 208 remains intact in the event that the pilot valve 114 needs to be separated from the main valve 112 for any reason. Also, since the main piston 188 seals the fluid chamber 208 from the lower end of the central bore 180, the hydraulic fluid in the fluid chamber is isolated from the valve bore 124 of the main valve 112. As a result, the connection between the main valve body 116 and the pilot valve body 172 does not need to be sealed against the hydraulic fluid pressure. Consequently, the main valve 112 and the pilot valve 114 can be assembled and serviced as separate components prior to being connected together to form the pressure relief valve 110.

It should be recognized that, while the present invention has been described in relation to the preferred embodiments thereof, those skilled in the art may develop a wide variation of structural and operational details without departing from the principles of the invention. For example, the various elements shown in the different embodiments may be combined in a manner not illustrated above. Therefore, the appended claims are to be construed to cover all equivalents falling within the true scope and spirit of the invention.

What is claimed is:

1. A pressure relief valve which operates to control the flow of fluid from a flow line to a vent line when the pressure of the fluid in the flow line reaches a predefined maximum pressure, the pressure relief valve comprising:
   a valve body which includes an inlet bore that is connectable to the flow line, an outlet bore that is connectable to the vent line and a valve bore that extends to between the inlet and outlet bores;
   a valve member which is slidably supported in the valve bore and is moveable between a closed position in which the fluid in the flow line is prevented from flowing from the inlet bore to the outlet bore and an open position in which the fluid in the flow line is permitted to flow from the inlet bore to the outlet bore;

a solenoid operated pilot valve which is connected to the valve body over an end of the valve bore;

the pilot valve comprising a fluid chamber which is filled with a hydraulic fluid, the fluid chamber being sealed when the pilot valve is in a closed position, and the hydraulic fluid in the fluid chamber being operatively engaged with the valve member;

wherein in the closed position of the pilot valve the hydraulic fluid is trapped in the fluid chamber to thereby prevent the valve member from moving from its closed position to its open position, and in an open position of the pilot valve the hydraulic fluid is released from the fluid chamber to thereby allow the valve member to move from its closed position to its open position; and wherein during operation of the pressure relief valve, the pilot valve is initially closed to contain the hydraulic fluid in the fluid chamber and thereby maintain the valve member in its closed position against pressure in the flow line, and then, when the pressure in the flow line reaches the predefined maximum pressure, the pilot valve is opened to release the hydraulic fluid from the fluid chamber and thereby allow the valve member to move from its closed position to its open position.

2. The pressure relief valve of claim 1, wherein the pilot valve comprises a central bore within which the fluid chamber is formed and a first piston which is slidably positioned in the central bore between the fluid chamber and the valve member.

3. The pressure relief valve of claim 2, wherein the central bore is aligned with the valve bore and the valve member is configured to engage the first piston.

4. The pressure relief valve of claim 3, wherein the first piston is configured such that, as the pilot valve moves from its closed position to its open position, the first piston will displace the hydraulic fluid from the fluid chamber.

5. The pressure relief valve of claim 4, wherein the pilot valve further comprises:

a relief port which is connected to the central bore and into which the hydraulic fluid is displaced; and a second piston which is slidably supported in the central bore above the fluid chamber, the second piston being movable from a closed position in which the hydraulic fluid is prevented from flowing between the fluid chamber and the relief port and an open position in which the hydraulic fluid is permitted to flow between the fluid chamber and the relief port;

wherein the closed position of the second piston corresponds to the closed position of the pilot valve and the open position of the second piston corresponds to the open position of the pilot valve.

6. The pressure relief valve of claim 5, wherein the pilot valve further comprises:

a seat member which is secured and sealed in the central bore between the fluid chamber and the second piston, the seat member comprising a through hole which connects the fluid chamber to the relief port;

wherein in the closed position of the second piston the second piston prevents the hydraulic fluid in the fluid chamber from flowing through the through hole to the relief port, and in the open position of the second piston the second piston permits the hydraulic fluid in the fluid chamber to flow through the through hole to the relief port.

7. The valve member of claim 6, wherein the seat member comprises a valve seat which is connected to the through hole and the second piston comprises a closure member which is configured to sealingly engage the valve seat when the second piston is in the closed position.

8. The valve member of claim 5, wherein the pilot valve further comprises:

a relief bore which is connected to the relief port; and a third piston which is slidably supported in the relief bore to thereby define a relief chamber that is connected to the relief port;

wherein when the pilot valve is open and the valve member moves from its closed position to its open position, the hydraulic fluid is displaced through the relief port and into the relief chamber.

9. The valve member of claim 8, wherein the pilot valve further comprises means for controlling the pressure which the third piston exerts on the hydraulic fluid.

10. The valve member of claim 9, wherein the pressure controlling means comprises a compression spring which is operatively engaged between the third piston and a member which is fixed in position relative to the relief bore.

11. The valve member of claim 10, wherein the member which is fixed in position relative to the relief bore comprises a body cap which is connected to the pilot valve over the spring member and the third piston.

12. The valve member of claim 10, wherein the spring member is selected such that the third piston will exert a pressure on the hydraulic fluid of between about 200 psi and 250 psi.

13. The valve member of claim 10, wherein the spring member is selected such that, when the pilot valve is open and the pressure of the fluid in the flow line drops to less than about 200 psi, the third piston will displace the hydraulic fluid from the relief chamber back through the relief port and into the fluid chamber.

14. The valve member of claim 8, further comprising means for providing a visual indication that the valve member is in its open position.

15. The valve member of claim 14, wherein the visual indication means comprises a stem which is connected to the third piston, wherein when the third piston is displaced by the hydraulic fluid entering the relief chamber, the stem will extend from an initial position which is indicative that the valve member is in its closed position to an extended position which is indicative that the valve member is in its open position.

16. The pressure relief valve of claim 1, wherein the valve member comprises a lower end portion which, when the valve member is in its closed position, extends through and seals against a seal that is positioned between the inlet and outlet bores to thereby prevent fluid in the flow line from flowing between the inlet and outlet bores.

17. The pressure relief valve of claim 1, wherein the valve member comprises a lower end portion and a seal which is mounted on the lower end portion, wherein when the valve member is in its closed position, the seal seals against a portion of the valve bore located between the inlet and outlet bores to thereby prevent fluid in the flow line from flowing between the inlet and outlet bores.

18. The pressure relief valve of claim 1, further comprising:

a pressure transducer which generates signals indicative of the pressure in the flow line; and a controller which actuates the pilot valve in response to the signals generated by the pressure transducer;

wherein when the pressure in the flow line reaches the predefined maximum pressure, the controller opens the pilot valve to release the hydraulic fluid from the fluid chamber and thereby allow the valve member to move from its closed position to its open position.

19. The pressure relief valve of claim 1, wherein the valve member is slidably supported in a poppet cage which is positioned in the valve bore and which comprises at least one transverse flow port which allows for fluid communication between the inlet and outlet bores.

20. The pressure relief valve of claim 19, wherein the valve member comprises a lower end portion which, when the valve member is in its closed position, extends through and seals against a seal that is supported on the poppet cage between the inlet bore and the flow port to thereby prevent fluid in the flow line from flowing between the inlet and outlet bores.

21. The pressure relief valve of claim 19, wherein the valve member comprises a lower end portion and a seal which is mounted on the lower end portion, wherein when the valve member is in its closed position, the seal seals against a portion of the poppet cage located between the inlet bore and the flow port to thereby prevent fluid in the flow line from flowing between the inlet and outlet bores.

22. A method for operating a pressure relief valve comprising a valve body which includes an inlet bore that is connectable to a flow line, an outlet bore that is connectable to a vent line, and a valve bore that extends to between the inlet and outlet bores, the method comprising:
  providing a valve member which is axially movable in the valve bore between a closed position in which the valve member blocks fluid in the flow line from flowing between the inlet and outlet bores and an open position in which the valve member permits fluid in the flow line from flowing between the inlet and outlet bores;
  providing a solenoid operated pilot valve which is connected to the valve body over and end of the valve bore, the pilot valve comprising a fluid chamber which is filled with a hydraulic fluid, the fluid chamber being sealed when the pilot valve is in a closed position, and the hydraulic fluid in the fluid chamber being operatively engaged with the valve member;
  closing the pilot valve to trap the hydraulic fluid in the fluid chamber and thereby maintain the valve member in its closed position against pressure in the flow line; and
  when the pressure in the flow line reaches a predetermined level, opening the pilot valve to release the hydraulic fluid from the fluid chamber and thereby allow the valve member to move from its closed position to its open position.

* * * * *